Figure 1:
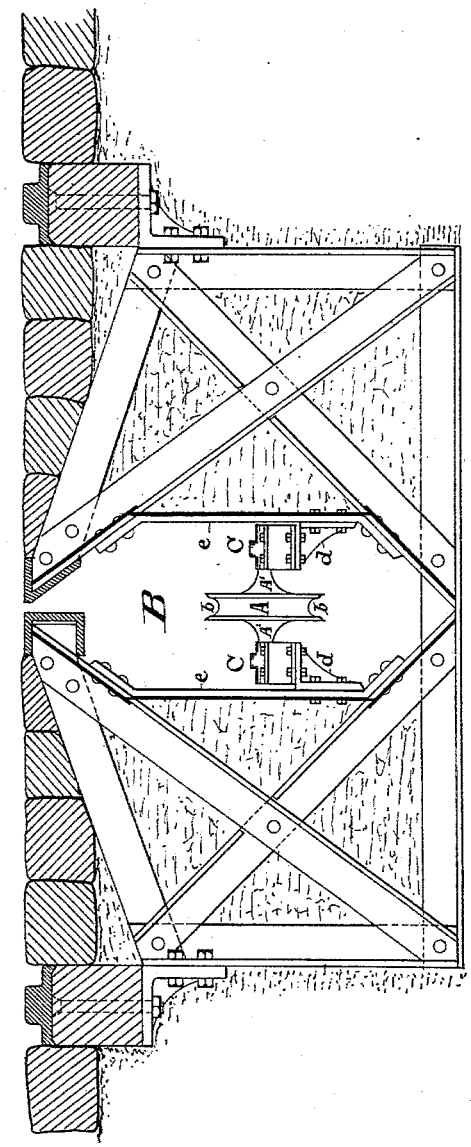

(No Model.) 3 Sheets—Sheet 1.

R. SOLANO.
CARRYING PULLEY FOR CABLE RAILWAYS.

No. 331,836. Patented Dec. 8, 1885.

WITNESSES:
Grunwald Oas
John G. Honey

INVENTOR
Renaldo Solano
BY James A. Whitney
ATTORNEY (No Model.) 3 Sheets—Sheet 2.
R. SOLANO.
CARRYING PULLEY FOR CABLE RAILWAYS.
No. 331,836. Patented Dec. 8, 1885.
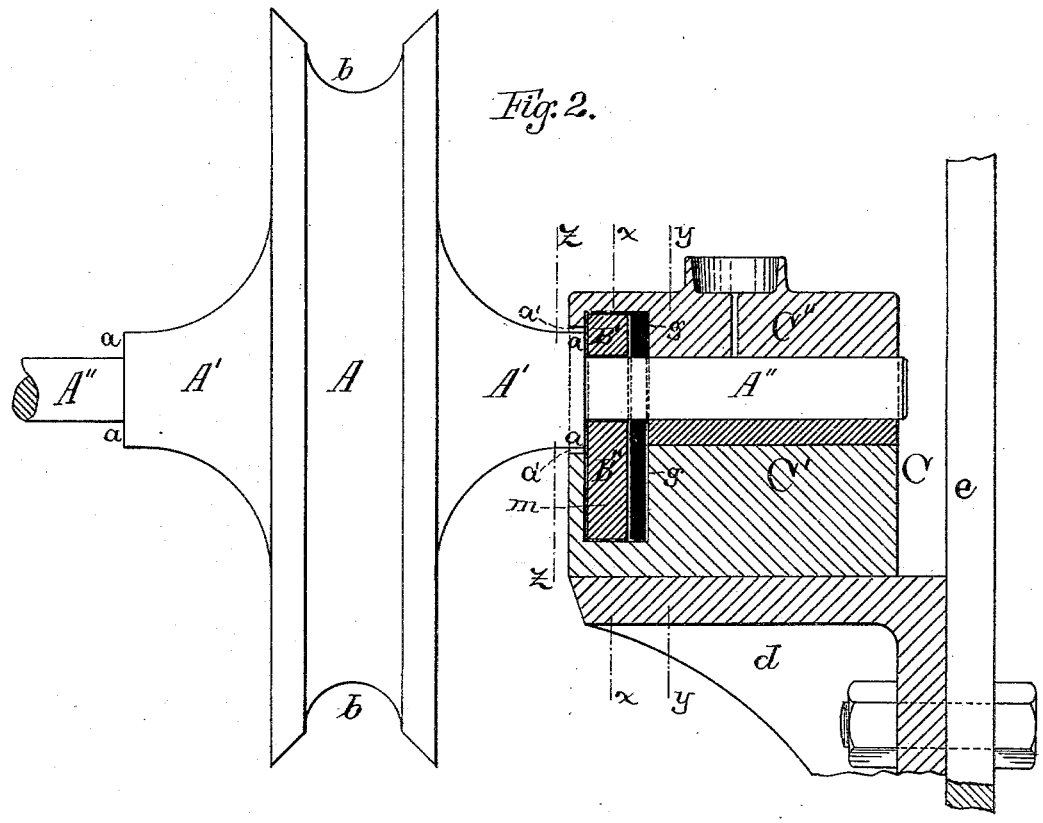
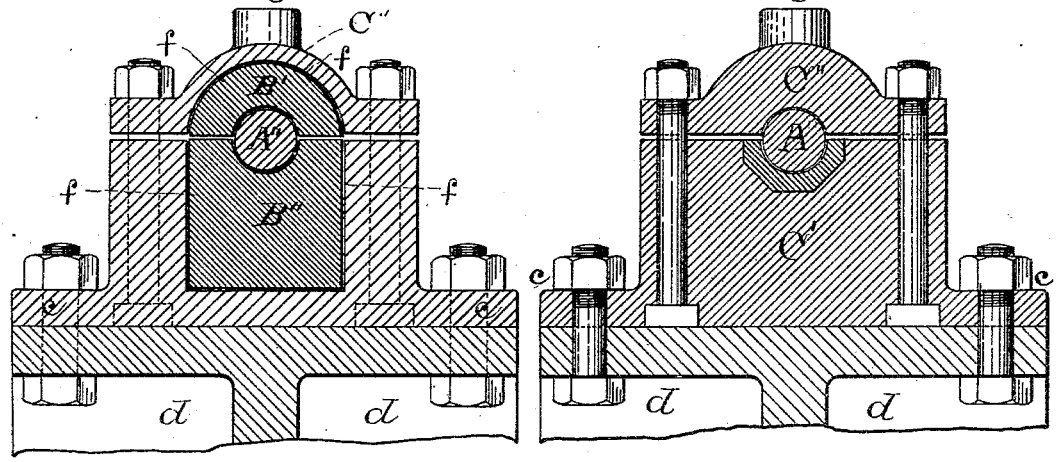
WITNESSES
Gunvald Aas.
John G. Honey.
INVENTOR
Renaldo Solano
By James A. Whitney
Attorney.

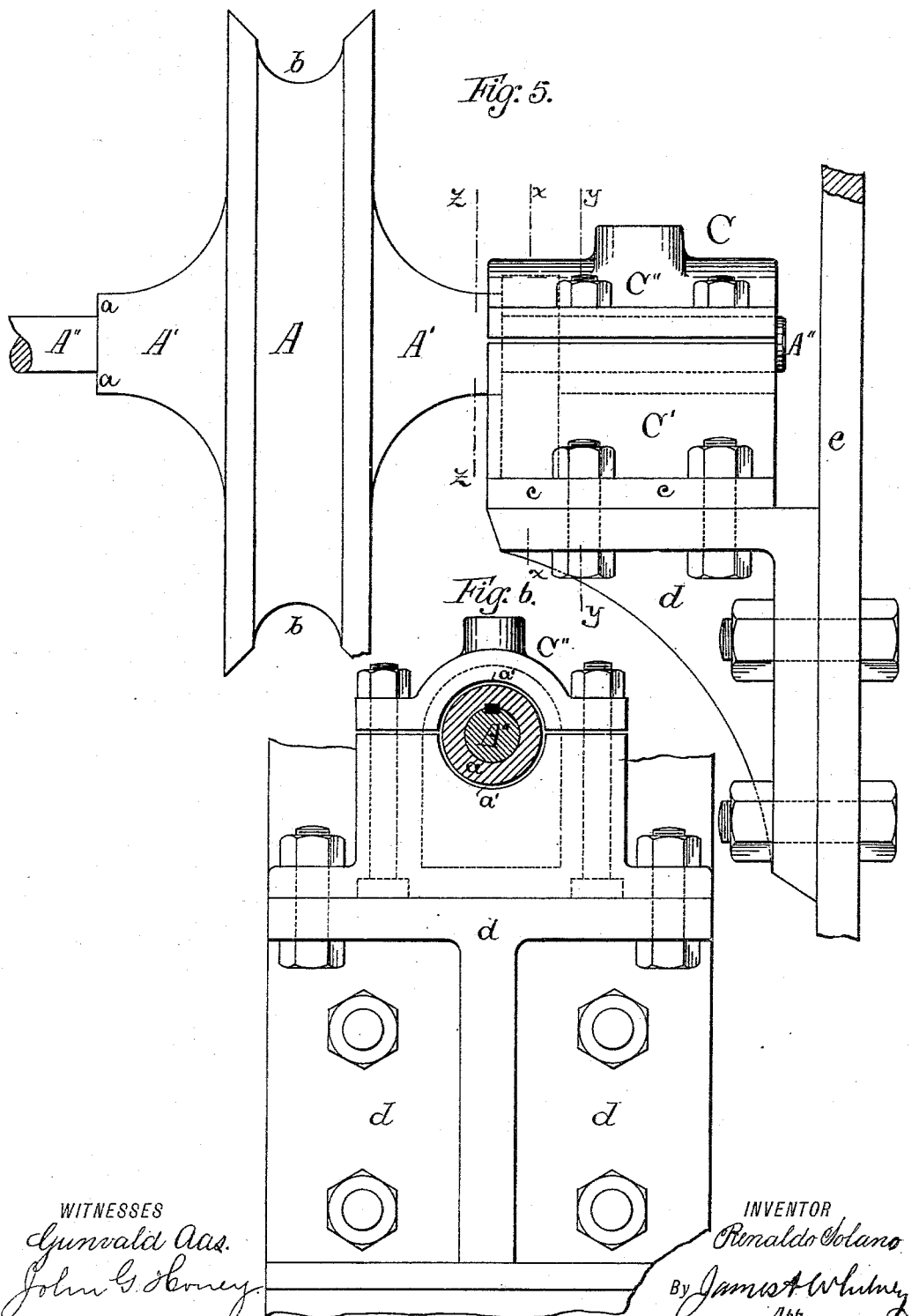

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

CARRYING-PULLEY FOR CABLE RAILWAYS.

SPECIFICATION forming part of Letters Patent No. 331,836, dated December 8, 1885.

Application filed May 5, 1885. Serial No. 164,453. (No model.)

*To all whom it may concern:*

Be it known that I, RENALDO SOLANO, late of San Francisco, in the State of California, but now of Brooklyn, in the county of Kings and State of New York, have invented certain Improvements in Carrying-Pulleys for Cable Railways, of which the following is a specification.

In the construction of "cable-railways," so called, the propelling-cable is supported upon pulleys placed at intervals within and along the length of subterranean conduits, longitudinally slotted at their upper sides to permit the extension of the gripping devices, from the vehicle to be propelled to the cable aforesaid, by which propulsion is afforded. These pulleys are in practice necessarily made of metal, and are provided axially with suitable journals or gudgeons, which run in ordinary metallic journal-boxes duly arranged at opposite sides of the conduit. The journals or gudgeons aforesaid have necessarily some slight longitudinal play, and even if it were possible to avoid this in the first instance the wear of the pulleys from use would soon produce it. The running of the cable rotates the pulleys at a correspondingly-high speed, and the slight sinuosities which always exist in the cables used for such purposes rapidly throw the pulleys alternately from side to side within the limits afforded by the end-play referred to, thereby bringing the ends of the metallic hubs or bosses of the pulleys in violent contact with the adjacent surfaces of the bearings or journal-boxes. This causes a constant succession of resounding or hammering sounds from each pulley, and these sounds being reverberated throughout the length of the conduit are multiplied and conducted to great distances, and frequently become an almost intolerable nuisance to residents along the line or in the neighborhood of cable-railways. My invention is designed to obviate this difficulty by providing a pulley mechanism in which the noise produced by the jar of the pulley as aforesaid is substantially neutralized, and my said invention comprises certain parts and combination of parts whereby said object is effectually secured.

Figure 1 is a transverse sectional view illustrating how said invention may be applied within the conduit of a cable railway. Fig. 2 is a vertical sectional view, on a larger scale, taken in line with the axis of the pulley, and further illustrating my said invention. Fig. 3 is a vertical sectional view in a plane transverse to that of Figs. 2 and 4, and in the line $x\,x$ thereof. Fig. 4 is a similar view taken in the line $y\,y$ of Figs. 2 and 4. Fig. 4 is an edge view of the pulley and an end view of the journal-boxes. Fig. 5 is a sectional view taken in a plane at right angles to Figs. 2 and 4, and in the line $z\,z$ thereof. Fig. 6 is a vertical transverse sectional view taken in the line $z\,z$ of Fig. 5.

A represents one of the pulleys which are placed at suitable intervals along the length of the conduit B.

A′ is the usual hub or boss of the pulley, the flat ends of said bosses or hubs being shown in $a$.

A″ are the axial journals or gudgeons of the pulley. The journals A″ and bosses A′ may be integral with the pulley A or otherwise, as preferred. The pulley A may have the usual semicircular circumferential groove, $b$, in which the cable runs in the usual manner.

C are the journal-boxes, each constructed with any or the usual bottom or bearing portion, C′, and removable cap C″. The bottom or bearing portion C′ may be fixed in proper position within the conduit by any suitable means; but, as represented in the drawings, it is provided with lateral flanges $c$, bolted to a bracket, $d$, which is itself bolted to an iron, $e$, which in its turn is bolted to the sides of the conduit, as represented in Fig. 1. The two parts C′ and C″ of the journal-box C, at their inner side—that is to say, the side next adjacent to the hub A′ of the pulley—are coincidently chambered, as shown at $f$, thereby providing a receptacle for a packing block or blocks or devices, formed of material or materials possessing the property of deadening or neutralizing sound or of preventing, to a greater or less degree, the transmission of sound, the said chamber $f$ having a suitable opening, $a'$, through which the adjacent ends $a$ of the hub or boss A′ may enter and come in contact with the non-conductor of sound placed in the chamber $f$, as aforesaid. So far as concerns the broader features of my said invention, this non-conductor of sound may be composed of any suitable material—as, for example, blocks of wood; but the most advantageous results may be obtained by the construction represented in detail in Fig. 2.

The non-conductor of sound, of whatever material made, may be most conveniently formed and applied in upper and lower portions, B' and B'', each circumferentially shaped to fit into its proper portion of the chamber f and around the contiguous journal or gudgeon A'', as shown in Fig. 3.

As represented in Fig. 2, the non-conductor of sound is composed, preferably, of a backing, g, of india-rubber or other suitable elastic material, which is to a greater or less degree a non-conductor of sound, and a front or contact block, m, of wood, which receives the impact of the end a of the adjacent boss A'. The slightly-yielding action bodily afforded to the block m by the elastic backing behind it diminishes the force of the impact of the boss A' of the said block, and thereby diminishes the production of sound in the first instance, while the non-conducting character of the block m and of the packing g neutralizes and practically prevents its transmission.

It is of course to be understood that in practice the devices described are to be duplicated for each pulley—that is to say, each of the journals or gudgeons A'' of each pulley should be provided with my said invention.

So far as concerns the broader features of my said invention the pulley A may be devoid of bosses or hubs A', and with the non-conductor of sound arranged to come in direct contact with the sides of the pulley.

What I claim for my invention is—

1. A journal-box for the carrying-pulleys of cable railways, constructed with a chamber, f, for the reception of a non-conductor of sound, substantially as and for the purpose herein set forth.

2. The combination, with a pulley, A, and its journal or gudgeon A'', of a journal-box constructed with a chamber, f, and a non-conductor of sound placed in said chamber and arranged to receive the impact from the pulley.

3. The combination, with a pulley, A, and its journal or gudgeon A'', of a journal-box constructed with a chamber, f, a non-conductor of sound composed of an impact-block, m, and elastic packing g, and arranged within the chamber f to receive the impact from the pulley, all substantially as and for the purpose herein set forth.

4. The combination, with the pulley A, constructed with a boss, A', and its journal or gudgeon A'', of a journal-box constructed with a chamber, f, having an opening, a', a non-conductor of sound placed in the said chamber and arranged to receive the impact of the pulley by the thrust of the end a of the boss A' through the opening a' into contact with said non-conductor of sound, substantially as and for the purpose herein set forth.

5. The combination, with the pulley A, constructed with a boss, A', and its journal or gudgeon A'', of a journal-box constructed with a chamber, f, having an opening, a', a non-conductor of sound composed of a contact block, m, and an elastic packing, g, placed in the said chamber and arranged to receive the impact of the pulley A by the thrust of the end a of the boss A' through the opening a' into contact with the contact-block, all substantially as and for the purpose herein set forth.

RENALDO SOLANO.

Witnesses:
GUNVALD AAS,
JOHN G. HONEY.